United States Patent [19]

Bauer et al.

[11] 4,143,033
[45] Mar. 6, 1979

[54] WATER-SOLUBLE DISAZO DYESTUFFS CONTAINING A 2-PHENYL-BENZIMIDAZOLYL,-BENZOXAZOLYL OR-BENZTHIAZOLYL MIDDLE COMPONENT

[75] Inventors: Wolfgang Bauer, Maintal; Joachim Ribka, Offenbach am Main, Bürgel, both of Fed. Rep. of Germany

[73] Assignee: Cassella Aktiengesellschaft, Frankfurt am Main Fechenheim, Fed. Rep. of Germany

[21] Appl. No.: 778,049

[22] Filed: Mar. 16, 1977

[30] Foreign Application Priority Data

Mar. 24, 1976 [DE] Fed. Rep. of Germany ....... 2612454

[51] Int. Cl.² .............................................. C09B 35/34
[52] U.S. Cl. .................... 260/155; 260/141; 260/156; 260/157; 260/158; 260/160
[58] Field of Search ............... 260/157, 158, 155, 156, 260/160

[56] References Cited

U.S. PATENT DOCUMENTS 4,033,945  7/1977  Bauer et al. ........................ 260/157

FOREIGN PATENT DOCUMENTS 2151470  4/1973  Fed. Rep. of Germany ........... 260/159

*Primary Examiner*—Charles F. Warren
*Attorney, Agent, or Firm*—Connolly and Hutz

[57] ABSTRACT

Very desirable water-soluble disazo dyes have the structure

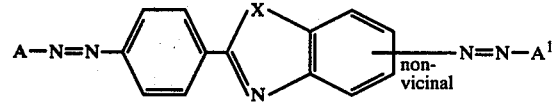

where one of A and $A^1$ is a selected N-substituted amino naphthol.

11 Claims, No Drawings

WATER-SOLUBLE DISAZO DYESTUFFS CONTAINING A 2-PHENYL-BENZIMIDAZOLYL,-BENZOXAZOLYL OR-BENZTHIAZOLYL MIDDLE COMPONENT

The present invention relates to water-soluble disazo dyes.

Among the objects of the present invention is the provision of novel water-soluble disazo dyes of particularly desirable properties, yet relatively simple to prepare.

The foregoing as well as additional objects of the present invention will be more fully understood from the following description of several of its exemplifications.

According to the present invention very effective dyeing of textiles is accomplished with water-soluble disazo dyes having the structure

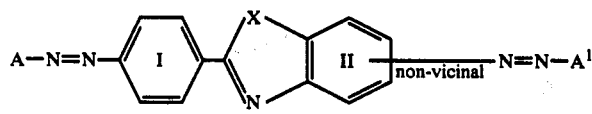

where
X is $-\overset{R}{N}-$, $-O-$ or $-S-$,
R denoting hydrogen, alkyl having up to 4 carbons, phenyl or benzyl,
one of A and $A^1$ is

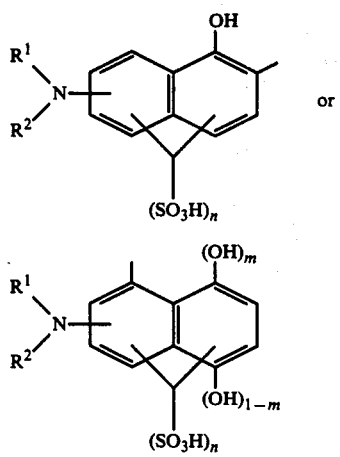

$R^1$ and $R^2$ being identical or different, each representing alkyl having up to 4 carbons, alkyl carbonyl having 2 to 5 carbons, aryl or aroyl each having 6 to 12 carbons, hydroxyalkyl having 2 to 4 carbons or sulfoalkyl or carboxyalkyl each having up to four alkyl carbons, and one of $R^1$ and $R^2$ can be hydrogen,
n being 1 or 2,
m being 0 or 1,
and the other of A and $A^1$ is a radical of a hydroxybenzene, aminobenzene, amino-hydroxy-benzene, hydroxynaphthalene, N-mono- or N,N-disubstituted aminonaphthalene, N-mono- or N,N-disubstituted amino-hydroxy-naphthalene, pyrazolone, 6-hydroxy-2-pyridone, 2,6-diaminopyridine, acetoacetic acid arylamide or dihydroxyquinoline coupling component.

The non-vicinal designation applied to one of the bonds means that the bond goes to a position on the benzene ring remote from the heterocyclic ring to which the benzene ring is fused.

If the radical of the coupling component is derived from the benzene series, it is a phenyl radical which is monosubstituted or disubstituted by amino and/or hydroxyl and the amino groups can also be monosubstituted or disubstituted by alkyl radicals or monosubstituted by aryl, aroyl or alkyl carbonyl, or disubstituted by alkyl carbonyl and alkyl or aryl and alkyl, or monosubstituted or disubstituted by carboxyalkyl, sulfoalkyl or hydroxyalkyl.

If the radical of the coupling component is derived from the naphthalene series, it is a 1-naphthyl or 2-naphthyl radical which is monosubstituted or disubstituted by a substituted amino group and/or hydroxyl group and the amino groups are mono- or disubstituted by alkyl radicals or monosubstituted by aryl, aroyl or alkyl carbonyl, or disubstituted by alkyl carbonyl and alkyl or aryl and alkyl, or monosubstituted or disubstituted by carboxyalkyl, sulfoalkyl or hydroxyalkyl.

The phenyl nucleus of said coupling components can also be further substituted by alkyl, alkoxy, alkylthio, cyano, nitro, sulfo, carboxyl, halogen, alkoxycarbonyl, acyl or aroyl.

The naphthyl nucleus of said coupling components can also be further substituted by alkyl, alkoxy, sulfo, carboxyl, halogen.

The alkyl, alkoxy, alkylthio and alkoxycarbonyl present in said coupling components have 1-4 C atoms, the aryl and aroyl radicals have 6-12 C atoms, the alkyl carbonyl radicals have 2-5 C atoms, the carboxyalkyl and sulfoalkyl radicals have 1-2 C atoms and the hydroxyalkyl radicals have 2 C atoms.

In a preferred group of dyestuffs according to the invention the phenyl radical is monosubstituted or disubstituted by amino and/or hydroxyl and the amino groups can carry one sulfoethyl, sulfomethyl, carboxymethyl, carboxyethyl, hydroxyethyl, acetyl, benzoyl, phenyl or tolyl substituent or one or two methyl or ethyl substituents and the phenyl radical can also be monosubstituted additionally by alkyl having 1-2 C atoms, alkoxy having 1-2 C atoms, carboxyl, sulfo, chloro or nitro.

A further preferred group of dyestuffs according to the invention contains an α-naphthyl or β-naphthyl radical which is monosubstituted or disubstituted by a substituted amino group and/or hydroxyl group and the amino groups carry one sulfoethyl, sulfomethyl, carboxymethyl, carboxyethyl, hydroxyethyl, acetyl, benzoyl, phenyl or tolyl substituent or one or two methyl or ethyl substituents and the naphthyl radical can also be monosubstituted additionally by sulfo, carboxyl or chlorine or disubstituted additionally by $-SO_3H$.

When the radical of the coupling component is a pyrazolone, the preferred structures are

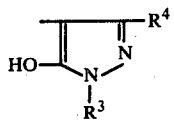

where
R$^3$ is hydrogen, alkyl having up to 4 carbons, or phenyl or naphthyl both of which can be substituted by sulfo, nitro, amino, cyano, halo, alkyl having up to 4 carbons, or alkoxy having up to 4 carbons, and R$^4$ is hydrogen, alkyl having up to 4 carbons, carboxyl, or alkoxycarbonyl having up to 5 carbons.

When the radical of the coupling component is a pyridone the preferred structures are

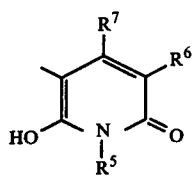

where
R$^5$ and R$^7$ are independently hydrogen or alkyl having up to 4 carbons, and
R$^6$ is hydrogen, cyano, —CONH$_2$ or SO$_3$H When the radical of the coupling component is an acetoacetic acid arylamide, the preferred structures are

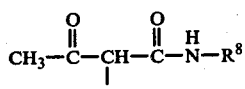

where R$^8$ is phenyl or naphthyl both of which can be substituted by sulfo, carboxyl, halogen, alkyl having up to 4 carbons and alkoxy having up to four carbons.

The radical of a coupling component in the dyestuffs according to the invention can also be a 2,4-dihydroxy-2-quinolyl or 2,6-diamino-5-pyridyl radical.

The nuclei I and II of the heterocyclic middle component can be substituted by one or two identical or different substituents from the group of alkyl and/or alkoxy, each having 1 or 2 C atoms, and/or halogen. Dyestuffs according to the invention, in which the nuclei I and/or II are unsubstituted or are substituted by a methyl group or chlorine, are preferred. Dyestuffs according to the invention, in which the heterocyclic middle component is a divalent radical of 2-phenylbenzimidazole are particularly preferred.

The dyes of the present invention are readily prepared by coupling a diazotized monoazo dye such as

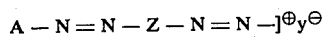

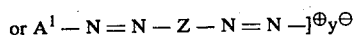

where
Z denotes a radical of the formula

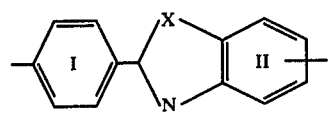

y$^\ominus$ is the anion of a mineral acid as hydrochloric or sulfuric acid, with the remaining component of the desired dye.

When coupling to a key component having the general formula IIa or IIIa,

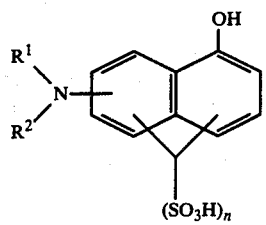

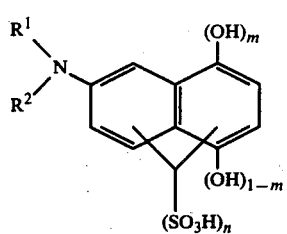

it is preferred to use the following specific, substituted aminonaphthols:

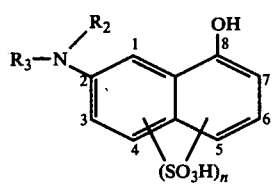

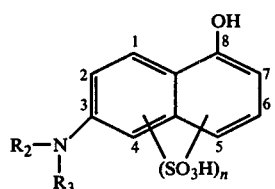

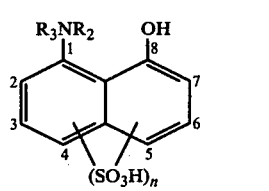

These have two positions at which coupling can take place.

At alkaline pH values of 7 to 12, the coupling takes place in the 7-position of the coupling components VII, VIII and IX, as shown, while at acid acid pH values of 1 to 5 the coupling takes place with the N-substituted 2-amino-8-hydroxynaphthalenesulfonic acid of the formula VII in the 1-position and with the N-substituted 3-amino-8-hydroxynaphthalensulfonic acid of the formula VIII in the 4-position of the naphthalene nucleus.

Accordingly, in the case of alkaline coupling with the amino-naphthol coupling components of the formula VII, VIII and IX, the structures

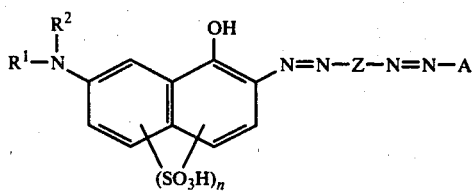

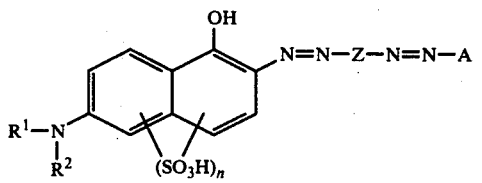

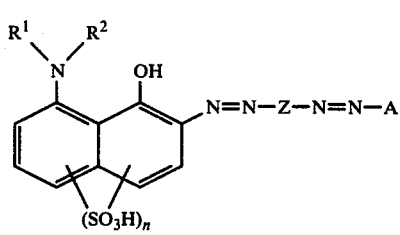

are obtained for the final dyes of the general formula I.

If the coupling with coupling components of the formula VII or VIII takes place in an acid medium, the structures

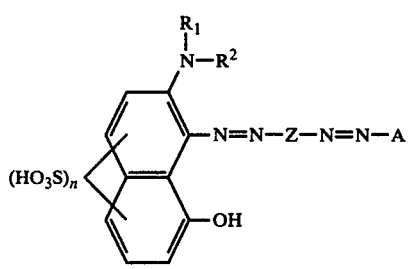

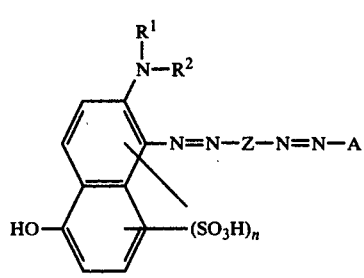

are obtained for the final dyes.

It is also possible to carry out the manufacturing process as a one-pot process. For this purpose, a tetrazo compound of the formula XV

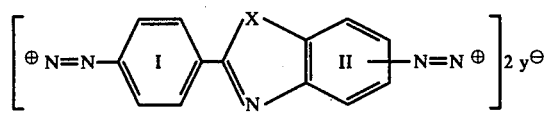

wherein $y^\ominus$ is the anion of a mineral acid, is coupled in any desired sequence with a key coupling component of the formula IIa or IIIa in the pH range between 0 and 14, and with the second coupling component of A and $A^1$ in the pH range from 7 to 14 or, of said second coupling component is a coupling component of the aniline or naphthylamine series, in the pH range from 0 to 14.

For this purpose it is only necessary to adjust the pH value to the value desired for the second coupling by adding alkali or acid, after the conclusion of the one-sided coupling of the tetrazo compound XV with the first coupling component.

Either or both of the diazonium groups of the tetrazo compound XV can couple at the first coupling step so that isomeric coupling products are obtained, usually in mixtures. These isomers only differ from each other by the inversion of the Z bonds, and are generally of interchangeable properties.

In a particular embodiment of this process it is possible to manufacture disazo dyes of the general formula I wherein A is a key component II by compling a diazotized monoazodye of the formula

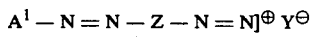

in the pH range from 7 to 14, preferably 7.5 to 10, at temperatures of $-10°$ to $+30°$ C., with a coupling component of the formula VII, VIII or IX in a position adjacent to the hydroxyl group of the naphthalene nucleus.

The required diazotized monoazo dye can be obtained by tetrazotizing the heterocyclic diamine

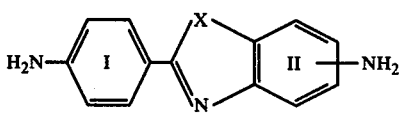

in a manner which is in itself known and coupling the product, on one side, with the coupling component $A^1$—H at pH values of 3 to 12, preferably 4 to 9 and at temperatures of $-10°$ to $+30°$ C.

A further particular embodiment of this process for the manufacture of water-soluble diazo dyes of the general formula I consists in coupling a diazotized monoazo dye of the formula XVII

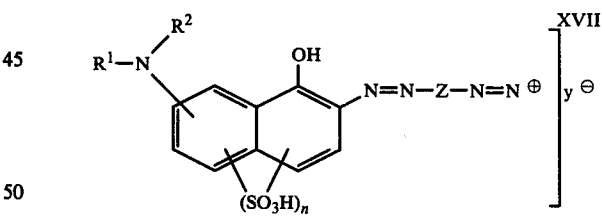

wherein Z, $y^\ominus$, $R^1$, $R^2$ and n have the above-mentioned meanings, with the second coupling component at pH values between 7 and 14, preferably 7.5 to 10, if the second coupling component is of the aniline or naphthylamine series, at pH values between 0 and 14, preferably 1 and 10, and at temperatures between $-10°$ and $+30°$ C., preferably 0° and 10° C.

The required diazotized monoazo dye XVII can be manufactured by coupling the tetrazotized heterocyclic diamine XVI on one side with coupling components VII, VIII or IX at pH values of 7 to 14, preferably 7.5 to 10, and at temperatures of $-10°$ to $+30°$ C.

Water-soluble disazo dyes of the general formula I wherein A is a key component III are manufactured by coupling a diazotized monoazo dye of the formula

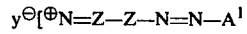

in the pH range from 0 to 6, preferably 1 to 4, at temperatures between −10° and +80° C., preferably 0° to +60° C., with coupling components of the formula VII or VIII.

The required diazotized monoazo dye can be manufactured as indicated above.

A variant of this process for the manufacture of water-soluble disazo dyes of the general formula I wherein A is a key component III consists in coupling a diazotized monoazo dye

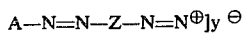

with the second coupling component A¹—H in the pH range from 2 to 14, preferably 3 to 10, or, if the remaining coupling component is of the aniline or naphthylamine series, at pH values between 0 and 14, preferably 1 and 10, at temperatures of −10° to +50° C., preferably 0° to +20° C.

The diazotized monoazo dye of the formula

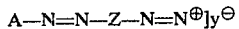

required for this process variant can be manufactured by tetrazotizing the heterocyclic diamine XVI

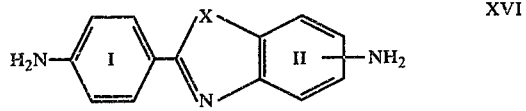

XVI and coupling on one side, at pH values of 0 to 6, preferably 1 to 4, and at temperatures of −10° to +80° C., preferably 0° to +50° C., with the key coupling component of the formula VII or VIII in a position adjacent to the amino group of the amino-naphthol coupling components.

The tetrazotization and all coupling reactions are preferably carried out in an aqueous medium. Water-miscible organic solvents, for example alcohols such as methanol or ethanol, can, if appropriate, be present in the aqueous medium.

The coupling reactions mentioned can be carried out in the presence of coupling accelerators, for example the known pyridine, urea or thiourea accelerators.

Examples of heterocyclic diamines XVI which are suitable for the manufacture of the disazo dyes of the present invention are: 2-(4'-aminophenyl)-5-(or 6)-amino-benzimidazole, 1-methyl-2-(4'-aminophenyl)-6-amino-benzimidazole, 1-methyl-2-(4'-aminophenyl)-5-aminobenzimidazole, 1-ethyl-2-(4'-aminophenyl)-5-amino-benzimidazole, 1-propyl-2-(4'-aminophenyl)-5-amino-benzimidazole, 1-butyl-2-(4'-aminophenyl)-5-amino-benzimidazole, 1-phenyl-2-(4'-aminophenyl)-5-amino-benzimidazole, 1-benzyl-2-(4'-aminophenyl)-5-amino-benzimidazole, 2-(4'-aminophenyl)-4-methyl-5-amino-benzimidazole (identical with 2-(4'-aminophenyl)-6-amino-7-methylbenzimidazole), 2-(4'-aminophenyl)-5-amino-6-methyl-benzimidazole (identical with 2-(4'-aminophenyl)-5-methyl-6-aminobenzimidazole), 2-(4'-aminophenyl)-5-amino-6-chloro-benzimidazole (identical with 2-(4'-aminophenyl)-5-chloro-6-aminobenzimidazole), 2-(4'-aminophenyl)-5-amino-7-chloro-benzimidazole (identical with 2-(4'-aminophenyl)-4-chloro-6-aminobenzimidazole), 2-(4'-aminophenyl)-5-amino-6-ethoxy-benzimidazole (identical with 2-(4'-aminophenyl)-5-ethoxy-6-aminobenzimidazole), 2-(2'-methyl-4'-aminophenyl)-5- (or 6)-aminobenzimidazole, 2-(3'-methyl-4'-aminophenyl) 5-(or 6)-aminobenzimidazole, 2-(2'-chloro-4'-aminophenyl)-5- (or 6)-aminobenzimidazole, 2-(3'-chloro-4'-aminophenyl)-5- (or 6)-aminobenzimidazole, 2-(4'-aminophenyl)-5-amino-benzoxazole, 2-(4'-aminophenyl)-6-amino-benzoxazole, 2-(4'-amino-2'-chlorophenyl)-5-amino-benzoxazole, 2-(4'-aminophenyl)-4-methyl-5-amino-benzoxazole, 2-(4'-aminophenyl)-5-amino-benzthiazole, 2-(4'-aminophenyl)-6-amino-benzthiazole, 2-(4'-aminophenyl)-6-methyl-5-amino-benzthiazole, 2-(4'-aminophenyl)-5-methyl-6-amino-benzthiazole and 2-(4'-aminophenyl)-5-chloro-6-amino-benzthiazole.

Tautomerism is possible in the case of the benzimidazoles which have X = —NH—, so that, for example, it is not then possible to distinguish between the 5-position and the 6-position. If further substituents are additionally present in the nucleus II, there are two different possible ways of numbering, as noted above.

The heterocyclic diamines can be obtained in accordance with the manufacturing methods described in German Offenlegungsschrift No. 2,424,462, pages 13 to 19 and in its U.S. counterpart application Ser. No. 579,156, filed May 20, 1975 (U.S. Pat. No. 4,033,945 granted July 5, 1977).

Examples of key coupling components are: 2-acetylamino-8-hydroxynaphthalene-6-sulphonic acid, 2-carboxymethylamino-8-hydroxynaphthalene-6-sulphonic acid, 2-benzoylamino-8-hydroxynaphthalene-6-sulphonic acid, 2-methylamino-8-hydroxynaphthalene-6-sulphonic acid, 2-dimethylamino-8-hydroxynaphthalene-6-sulphonic acid, 2-ethylamino-8-hydroxynaphthalene-6-sulphonic acid, 2-phenylamino-8-hydroxynaphthalene-6-sulphonic acid, 3-carboxymethylamino-8-hydroxynaphthalene-6-sulphonic acid, 3-acetylamino-8-hydroxynaphthalene-6-sulphonic acid, 3-phenylamino-8-hydroxynaphthalene-6-sulphonic acid, 3-benzoylamino-8-hydroxynaphthalene-6-sulphonic acid, 1-acetylamino-8-hydroxynaphthalene-3,6-disulphonic acid, 1-benzoylamino-8-hydroxynaphthalene-3,6-disulphonic acid and 1-benzoylamino-8-hydroxynaphthalene-4-sulphonic acid.

Examples of non-key coupling components suitable for the manufacture of the disazo dyes according to the present invention are: phenol, 2-methylphenol, 4-methylphenol, 3-chlorophenol, 3-methoxyphenol, 2-hydroxybenzenesulfonic acid, 3-hydroxybenzenesulfonic acid, 1,3-dihydroxybenzene, 1.3-dihydroxy-2-chlorobenzene, 1,3-dihydroxy-4-chlorobenzene, 1,3-dihydroxy-5-methylbenzene, 1,3-dihydroxy-4-hexylbenzene, 1,3-dihydroxybenzene-5-sulphonic acid, 1-amino-3-hydroxybenzene, 1-amino-3-hydroxy-4-chlorobenzene, 1-(2'-methylphenylamino)-3-hydroxybenzene, 1-(phenylamino)-3-hydroxybenzene, 3-aminophenol-4-sulphonic acid, 3-aminophenol-6-sulphonic acid, 1,3-diaminobenzene, 1,3-diamino-4-methylbenzene, 1,3-diamino-4-ethylbenzene, 1,3-diamino-4-n-propylbenzene, 1,3-diamino-4-n-butylbenzene, 1,3-diamino-4-chlorobenzene, 1,3-diamino-4-bromobenzene, 1,3-diamino-4-methoxybenzene, 1,3-diamino-4-ethoxybenzene, 1,3-diamino-4-n-propoxybenzene, 1,3-diamino-4-isopropoxybenzene, 1,3-diamino-4-nitrobenzene, 1-amino-3-dimethylaminobenzene, 1-amino-3-diethylaminobenzene, 1-acetylamino-3-diethylaminobenzene, 1-amino-3-carboxymethylaminobenzene, 1-amino-3-carboxyethylaminobenzene, 1-amino-3-sulphomethylaminobenzene, 1-amino-3-hydroxyethylaminobenzene, 1-amino-3-sulphoethylaminobenzene, 1,3-diaminobenzene-4-sulphonic acid, 2-hydroxybenzoic acid, 5-chloro-2-hydroxybenzoic acid, 2-hydroxy-3-methyl-benzoic acid, 2-hydroxy-4-methyl-benzoic acid, 2-hydroxy-5-sulpho-benzoic acid, 2-hydroxybenzoic acid ethyl ester, 1-hydroxynaphthalene, 1,6-dihydroxynaphthalene, 1-hydroxynaphthalene-3-sulphonic acid, 1-hydroxynaphthalene-4-sulphonic acid, 1-hydroxynaphthalene-3,6-disulphonic acid, 1-hydroxynaphthalene-5-, -6- and -7-sulphonic acid, 2-hydroxynaphthalene, 2-hydroxynaphthalene-3-carboxylic acid, 2-hydroxynaphthalene-6-, -7- and -8-sulphonic acid, 2-hydroxynaphthalene-3,6-disulphonic acid, 2-hydroxynaphthalene-6,8-disulphonic acid, 2-acetylamino-8-hydroxynaphthalene-6-sulphonic acid, 2-carboxymethylamino-8-hydroxynaphthalene-6-sulphonic acid, 2-benzoylamino-8-hydroxynaphthalene-6-sulphonic acid, 2-methylamino-8-hydroxynaphthalene-6-sulphonic acid, 2-dimethylamino-8-hydroxynaphthalene-6-sulphonic acid, 2-ethylamino-8-hydroxynaphthalene-6-sulphonic acid, 2-phenylamino-8-hydroxynaphthalene-6-sulphonic acid, 1,8-dihydroxynaphthalene-3,6-disulphonic acid, 3-carboxymethylamino-8-hydroxynaphthalene-6-sulphonic acid, 3-acetylamino-8-hydroxynaphthalene-6-sulphonic acid, 3-phenylamino-8-hydroxynaphthalene-6-sulphonic acid, 3-benzoylamino-8-hydroxynaphthalene-6-sulphonic acid, 1-acetylamino-8-hydroxynaphthalene-3,6-disulphonic acid, 1-benzoylamino-8-hydroxynaphthalene-3,6-disulphonic acid, 1-benzoylamino-8-hydroxynaphthalene-4-sulphonic acid, acetoacetic acid anilide, acetoacetic acid toluidide, acetoacetic acid 2-sulphoanilide, acetoacetic acid 3-sulphoanilide, acetoacetic acid 4-sulphoanilide, acetoacetic acid 4-carboxyanilide, acetoacetic acid 2-methoxyanilide, acetoacetic acid 4-methoxyanilide, acetoacetic acid 2-methyl-4-chloroanilide, acetoacetic acid 2-chloroanilide, acetoacetic acid 4-chloroanilide, acetoacetic acid 2,5-dimethoxy-4-chloroanilide, 3-methyl-5-pyrazolone, 1-phenyl-3-methyl-5-pyrazolone, 1-(2'-sulphophenyl)-3-methyl-5-pyrazolone, 1-(3'-sulphophenyl)-3-methyl-5-pyrazolone, 1-(4'-sulphophenyl)-3-methyl-5-pyrazolone, 1-phenyl-5-pyrazolone-3-carboxylic acid, 1-(4'-sulphophenyl)-5-pyrazolone-3-carboxylic acid, 1-(3'-nitrophenyl)-3-methyl-5-pyrazolone, 1-(4'-methylphenyl)-3-methyl-5-pyrazolone, 1-(4'-methylphenyl)-3-butoxycarbonyl-5-pyrazolone, 1-(2',5'-dichloro-4'-sulphophenyl)-3-methyl-5-pyrazolone, 1-(3'-sulphophenyl)-3-ethoxycarbonyl-5-pyrazolone, 1-(6'-chloro-3'-sulphophenyl)-3-methyl-5-pyrazolone, 1-(2'-chloro-4'-sulphophenyl)-3-methyl-5-pyrazolone, 1-(4'-sulpho-2'-methylphenyl)-3-methyl-5-pyrazolone, 5-cyano-6-hydroxy-2-pyridone, 4-methyl-3-cyano-6-hydroxy-2-pyridone, 4-methyl-3-carboxy-6-hydroxy-2-pyridone, 4-methyl-6-hydroxy-2-pyridone-3-carboxylic acid amide, 1,4-dimethyl-3-cyano-6-hydroxy-2-pyridone, 1-(n)-butyl-3-cyano-4-methyl-6-hydroxy-2-pyridone, 1-(2-ethylhexyl)-3-cyano-4-methyl-6-hydroxy-2-pyridone, 1-ethyl-3-cyano-4-butyl-6-hydroxy-2-pyridone, 1-ethyl-3-carboxy-4-ethyl-6-hydroxy-2-pyridone, 1-ethyl-3-sulpho-4-methyl-6-hydroxy-2-pyridone, 1,4-dimethyl-3-sulpho-6-hydroxy-2-pyridone, 4-methyl-3-sulpho-6-hydroxy-2-pyridone, 1-isopropyl-3-amidocarbonyl-4-methyl-6-hydroxy-2-pyridone, 2,4-dihydroxyquinoline and 2,6-diamino-3-cyano-4-methylpyridine.

The disazo dyes of the present invention are outstandingly suitable for use as direct dyes for dyeing and printing natural or synthetic fibre material containing hydroxyl groups or containing nitrogen, particularly cotton and regenerated cellulose as well as wool, wool-cotton combinations, silk, polyamide, leather and paper.

The dyeing and printing can be carried out by the customary processes.

Brown, red, violet and blue dyeings with good depth of colour are obtained on the substrates mentioned.

The dyeings are distinguished by good fastness properties, especially by good fastness to wet processing, for example fastness to water, washing at 40° C. and washing at 60° C., and by good fastness to perspiration (alkaline and acid) and fastness to acid. If X is

and especially

the disazo dyestuffs of the present invention are extensively absorbed onto the fibre materials to be dyed when dyeing by the exhaust process, so that a nearly clear residual liquor is obtained. With respect to the coloring strength, the substantivity and the various fastness properties of the dyeings mentioned above, the disazo dyes of the present invention are superior to related prior art dyes including those described in the U.S. Pat. No. 4,033,945. The new dyes are particularly suitable for dyeing fibres composed of cotton and regenerated cellulose and for dyeing polyamide, leather and paper.

In the examples which follow, parts denote parts by weight and percentages denote percentages by weight and the temperatures are quoted in degrees Centigrade, unless otherwise noted:

EXAMPLE 1

(a) 22.4 parts of 2-[4'-aminophenyl]-5 (or 6)-aminobenzimidazole in a mixture of 200 parts of water and 50 parts of 30% aqueous hydrochloric acid are tetrazotised with a solution of 13.8 parts of sodium nitrite in 50 parts of water, whilst adding ice, at 0°–5° C. Stirring is then continued for 1 hour at 0°–5° C. and excess nitrous acid is removed by means of amidosulfonic acid. A solution of 15.6 parts of 2-hydroxybenzoic acid and 40 parts of sodium carbonate in 150 parts of water is added in the course of approximately 15 minutes to the solution of the tetrazo component. One-sided coupling is complete after stirring subsequently for 2–3 hours at 0°–5° C.

A neutral solution of 26.7 parts of 2-dimethylamino-8-hydroxynaphthalene-6-sulfonic acid in 150 parts of water is then added rapidly to the suspension of the diazotized monoazo dye thus formed and the resulting coupling mixture is stirred for a further 3 hours at pH 8–10. The brown disazo dye of the structure

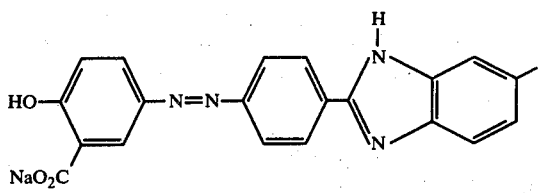

which is precipitated by the addition of 50 parts of sodium chloride at pH 7.5–8 is then filtered off and dried.

(b) A solution of 0.2 part of sodium carbonate and 4 parts of sodium sulfate decahydrate in 200 parts of water is then made up at 40° C. in a dye beaker, placed in a bath which can be heated.

0.2 part of the brown dye is then added. 10 g of a cotton fabric are kept in continuous agitation in the resulting ready-to-use dye liquor, the temperature is raised to 95° C. and dyeing is carried out for a further 45 minutes at this temperature. The dyed cotton fabric is then withdrawn from the dyeing bath which is now only slightly colored and the residual liquor adhering to the cotton is removed by wringing out. The dyed material is then rinsed with cold water and dried at 60° C.

A yellowish-tinged brown dyeing with good depth of color and with good fastness properties, especially good fastness to washing and fastness to perspiration as well as good stability to acid is obtained.

EXAMPLE 2

22.4 parts of 2-[4'aminophenyl]-5 (or 6)-aminobenzimidazole are tetrazotized in accordance with the instructions of Example 1. The pH of the resulting yellow-brown tetrazo solution is then adjusted to 3 with 10% aqueous sodium carbonate solution.

A solution of 36.1 parts of 1-acetylamino-8-hydroxynaphthalene-3,6-disulfonic acid, 4 parts of sodium hydroxide and 20 parts of sodium carbonate in 150 parts of water is then added in the course of approximately 10 minutes to the buffered solution of the tetrazo component, with stirring, and stirring is continued for 10 minutes at 0°–5° C. and at a pH of 7.5 to 8.5. A solution of 31.5 parts of 2-phenylamino-8-hydroxynaphthalene-6-sulfonic acid, 4 parts of sodium hydroxide and 20 parts of sodium carbonate in 200 parts of water is then added rapidly to the coupling mixture. Stirring is continued for 3 more hours at pH 8–9 in order to complete the coupling, the pH is then adjusted to 7.5 with 30% aqueous hydrochloric acid and the blue disazo dye of the structure

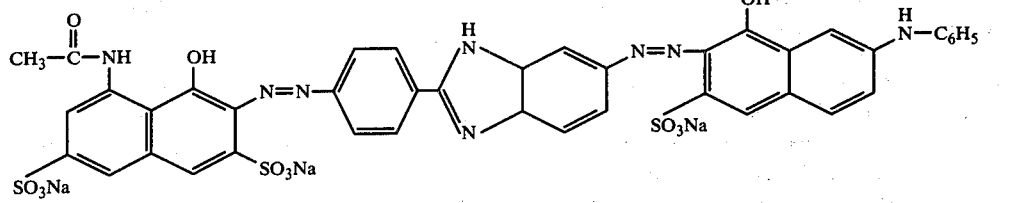

is filtered off and dried at 70°–80° C.

On cotton this dye produces a deep, blue dyeing with good fastness properties, especially good fastness to washing and good fastness to perspiration.

The structural constitution of further dyestuffs which can be similarly prepared are listed in the following tables.

The following data are given in the tables:

In column 1: the key coupling component IIa or IIIa used.

In column 2: the heterocyclic diamine used, heterocyclic diamines of the formula

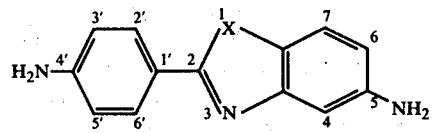

that is to say the 5-isomers, being listed in Table Ia and heterocyclic diamines of the formula

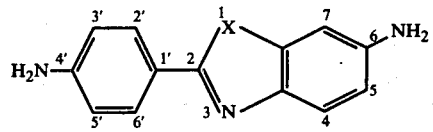

that is to say the 6-isomers, being listed in Table Ib. The meaning of X is given in the first position in column 2. In addition, substituents which may be additionally present and their position in the molecule are given in column 2, the numbering being indicated before. The indication "—NH—, 4-CH$_3$" in column 2 of Table I denotes thus, for example, the compound

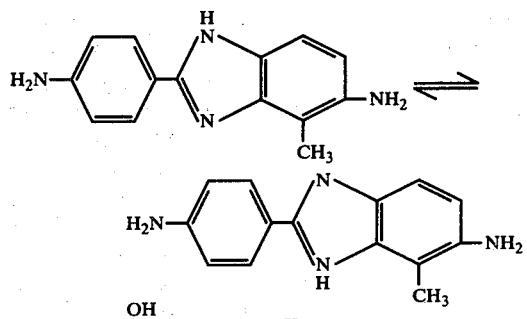

Owing to the possibility of tautomerism, this compound can be designated 4-methyl-2-(4'-aminophenyl)-5- aminobenzimidazole or 7-methyl-2-(4'-aminophenyl)-6-aminobenzimidazole.

In column 3: the second coupling component used
In column 4: the colour shade produced on cotton by dyeing in accordance with the example.

Table Ia

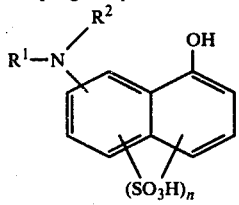 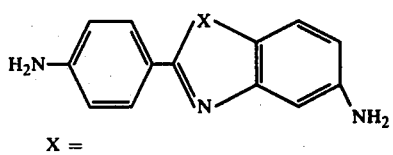

| Key coupling component | X = | Second coupling component | Colour shade on cotton |
|---|---|---|---|
| 2-Phenylamino-8-hydroxy-naphthalene-6-sulfonic acid | —NH— | 2-Hydroxybenzoic acid | brown |
| 2-Methylamino-8-hydroxy-naphthalene-6-sulfonic acid | —NH— | 2-Hydroxybenzoic acid | brown |
| 2-Ethylamino-8-hydroxy-naphthalene-6-sulfonic acid | —NH— | 2-Hydroxybenzoic acid | brown |
| 2-Acetylamino-8-hydroxy-naphthalene-6-sulfonic acid | —NH— | 2-Hydroxybenzoic acid | claret |
| 2-Carboxymethylamino-8-hydroxy-naphthalene-6-sulfonic acid | —NH— | 2-Hydroxybenzoic acid | brown |
| 2-Ethylamino-8-hydroxy-naphthalene-6-sulfonic acid | —NH— | 1-Acetylamino-8-hydroxy-naphthalene-3,6-disulfonic acid | blue |
| 3-Acetylamino-8-hydroxy-naphthalene-6-sulfonic acid | —NH— | 2-Hydroxybenzoic acid | red |
| 3-Carboxymethylamino-8-hydroxy-naphthalene-6-sulfonic acid | —NH— | 2-Hydroxybenzoic acid | red |
| 3-Phenylamino-8-hydroxy-naphthalene-6-sulfonic acid | —NH— | 1-Hydroxynaphthalene-3,6-disulfonic acid | violet |
| 3-Phenylamino-8-hydroxy-naphthalene-6-sulfonic acid | —NH— | 1-Hydroxynaphthalene-2,4-disulfonic acid | blue |
| 2-Dimethylamino-8-hydroxy-naphthalene-6-sulfonic acid | —NCH$_3$— | 2-Hydroxybenzoic acid | brown |
| " | —N(C$_6$H$_5$)— | 2-Hydroxybenzoic acid | brown |
| " | —N(CH$_2$—C$_6$H$_5$)— | 2-Hydroxybenzoic acid | brown |
| " | —NH—, 4-CH$_3$ | 2-Hydroxybenzoic acid | brown |
| " | —NH—, 7-Cl | 2-Hydroxybenzoic acid | brown |
| " | —NH—, 2'-CH$_3$ | 2-Hydroxybenzoic acid | brown |
| " | —NH—, 3'-Cl | 2-Hydroxybenzoic acid | brown |
| " | —NH—, 7-Cl, 3'-Cl | 2-Hydroxybenzoic acid | brown |
| " | —O— | 2-Hydroxybenzoic acid | brown |
| " | —S— | 2-Hydroxybenzoic acid | brown |
| " | —S—, 6-CH$_3$ | 2-Hydroxybenzoic acid | brown |
| 2-Hydroxyethylamino-8-hydroxynaphthalene-6-sulfonic acid | —NH— | 2-Hydroxybenzoic acid | brown |
| 3-Hydroxyethylamino-8-hydroxy-naphthalene-6-sulfonic acid | —NH— | " | red |
| 2-Carboxyethylamino-8-hydroxy-naphthalene-6-sulfonic acid | —NH— | " | brown |
| 3-Carboxyethylamino-8-hydroxy-naphthalene-6-sulfonic acid | —NH— | " | red |
| 2-Sulfomethylamino-8-hydroxy-naphthalene-6-sulfonic acid | —NH— | " | brown |
| 3-Sulfomethylamino-8-hydroxy-naphthalene-6-sulfonic acid | —NH— | " | red |
| 2-Hydroxyethylamino-8-hydroxy-naphthalene-6-sulfonic acid | —NH— | 2-Hydroxy-3-methylbenzoic acid | brown |
| 3-Hydroxyethylamino-8-hydroxy-naphthalene-6-sulfonic acid | —NH— | " | red |
| 2-Carboxyethylamino-8-hydroxy-naphthalene-6-sulfonic acid | —NH— | " | brown |
| 3-Carboxyethylamino-8-hydroxy-naphthalene-6-sulfonic acid | —NH— | " | red |
| 2-Sulfomethylamino-8-hydroxy-naphthalene-6-sulfonic acid | —NH— | " | brown |
| 3-Sulfomethylamino-8-hydroxy-naphthalene-6-sulfonic acid | —NH— | " | red |
| 2-Hydroxyethylamino-8-hydroxynaphthalene-6-sulfonic acid | —NH— | Acetoacetic acid-3-sulfoanilide | brown |
| " | —NH— | Acetoacetic acid-4-carboxyanilide | " |
| " | —NH— | Acetoacetic acid-4-sulfoanilide | " |
| " | —NH— | 1-(4'-Sulfophenyl)-3-methyl-pyrazolone(5) | " |
| " | —NH— | 1-Phenyl-3-carboxy-pyrazolone(5) | " |
| " | —NH— | 1-(4'-Sulfophenyl)-3-carboxy-pyrazolone(5) | " |
| " | —NH— | 4-methyl-6-hydroxypridone(2)-3-sulfonic acid | " |
| " | —NH— | 1,4-Dimethyl-6-hydroxy-pyridone(2)-3-sulfonic acid | " |
| " | —NH— | 1-(2'-Sulfophenyl)-3-methyl-pyrazolone(5) | " |
| " | —NH— | 1-(3'Sulfophenyl)-3-methyl-pyrazolone(5) | " |
| " | —NH— | 1-(2', 5'-Dichlor-4'-sulfo- | " |

Table Ia-continued

| Key coupling component 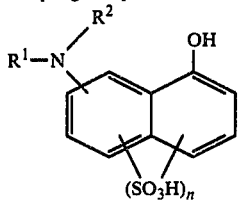 (SO₃H)ₙ | 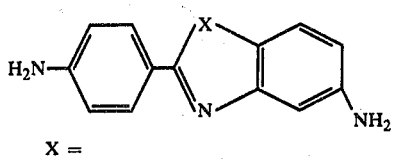 X = | Second coupling component | Colour shade on cotton |
|---|---|---|---|
| " | —NH— | phenyl)-3-methyl-pyrazolone(5) 1-(4'-Sulfophenyl)-3-ethoxycarbonyl pyrazolone(5) | " |
| 1-Acetamino-8-hydroxynaphthalene-3,6-disulfonic acid | —NH— | 2-Hydroxynaphthalene-3,6-disulfonic acid | blue-violet |
| " | —NH— | 2-Hydroxynaphthalene-6,8-disulfonic acid | blue-violet |
| 2-Carboxymethylamino-8-hydroxy-naphthalene-6-sulfonic acid | —NH— | 1-Phenyl-3-carboxy-pyrazolon(5) | brown |
| " | —NH— | 1-(2'-Sulfophenyl)-3-methyl-pyrazolone(5) | " |
| " | —NH— | 1-(3'-Sulfophenyl)-3-methyl-pyrazolone(5) | " |
| " | —NH— | 1-(4'Sulfophenyl)-3-methyl-pyrazolone(5) | " |
| " | —NH— | 1-(2', 5'-Dichlor-4'-Sulfophenyl)-3-methyl-pyrazolone(5) | " |
| " | —NH— | 1-(4'-Sulfophenyl)-3-carboxy-pyrazolone(5) | " |
| " | —NH— | 4-Methyl-5-hydroxypyridone(2)-3-sulfonic acid | " |
| " | —NH— | 1,4-Dimethyl-6-hydroxy-pyridone(2)-3-sulfonic acid | " |
| " | —NH— | Acetoacetic acid -3-sulfoanilide | " |
| " | —NH— | Acetoacetic acid-4-sulfoanilide | " |
| " | —NH— | Acetoacetic acid-4-carboxyanilide | " |
| " | —NH— | 1-(4'-Sulfophenyl)-3-methoxy-carbonylpyrazolone(5) | " |
| 2-Hydroxyethylamino-8-hydroxy-naphthalene-6-sulfonic acid | —NH— | 2-Hydroxynaphthalene-3,6-disulfonic acid | blue-violet |
| " | —NH— | 2-Hydroxynaphthalene-6,8-disulfonic acid | " |
| 2-Carboxymethylamino-8-hydroxynaphthalene-6-sulfonic acid | —NH— | 2-Hydroxynaphthalene-3,6 disulfonic acid | " |
| 3-Carboxymethylamino-8-hydroxynaphthalene-6-sulfonic acid | —NH— | 1-Phenyl-3-carboxy-pyrazolone (5) | red |
| " | —NH— | 1-(2'-Sulfophenyl)-3-methyl-pyrazolone(5) | " |
| " | —NH— | 1-(3'-Sulfophenyl)-3-methyl-pyrazolone(5) | " |
| " | —NH— | 1-(4'-Sulfophenyl)-3-methyl-pyrazolone(5) | " |
| " | —NH— | 1-(2', 5'-Dichloro-4'-Sulfophenyl-3-methyl-pyrazolone(5) | " |
| " | —NH— | 1-(4'-Sulfophenyl)-3-carboxy-pyrazolone(5) | " |
| " | —NH— | 4-Methyl-6-hydroxypyridone(2)-3-sulfonic acid | " |
| " | —NH— | 1,4-Dimethyl-6-hydroxy-pyridone(2)-3-sulfonic acid | " |
| " | —NH— | Acetoacetic acid-3-sulfoanilide | " |
| " | —NH— | Acetoacetic acid-4-sulfoanilide | " |
| " | —NH— | Acetoacetic acid-4-carboxyanilide | " |
| " | —NH— | 1-(4'-Sulfophenyl)-3-methoxy-carbonyl-pyrazolone(5) | " |
| 1-Benzoylamino-8-hydroxy-naphthalene-3,6-disulfonic acid | —NH— | 1-Acetylamino-8-hydroxynaphthalene-3,6-disulfonic acid | blue |
| 1-Acetylamino-8-hydroxy-naphthalene-3,6-disulfonic acid | —NH— | 3-Benzoylamino-8-hydroxynaphthalene-sulfonic acid | " |
| 3-Hydroxyethylamino-8-hydroxynaphthalene-6-sulfonic acid | —NH— | 1-(2'-Sulfophenyl)-3-methyl-pyrazolone(5) | red |
| " | —NH— | 1-(3'-Sulfophenyl)-3-methyl-pyrazolone(5) | " |
| " | —NH— | 1-(2', 5'-Dichlor-4'-sulfophenyl-3-methyl-pyrazolone(5) | " |
| " | —NH— | 1-(4'-Sulfophenyl)-3-ethoxy-carbonyl-pyrazolon(5) | " |
| 2-Carboxymethylamino-8-hydroxy-naphthalene-6-sulfonic acid | —NH— | 2-Hydroxy-3-methyl-benzoic acid | brown |
| 3-Carboxymethylamino-8-hydroxy-naphthalene-6-sulfonic acid | —NH— | 2-Hydroxy-3-methyl-benzoic acid | red |
| 3-Hydroxyethylamino-8-hydroxy-naphthalene-6-sulfonic acid | —NH— | Acetoacetic acid-3-sulfoanilide | " |
| " | —NH— | Acetoacetic acid-4-carboxyanilide | " |
| " | —NH— | Acetoacetic acid-4-sulfoanilide | " |
| " | —NH— | 1-(4'-Sulfophenyl)-3-methyl-pyrazolone(5) | " |

Table Ia-continued

Key coupling component: R¹—N(R²)— naphthalene with OH and (SO₃H)ₙ substituents; and H₂N—C₆H₄—benzazole(X)—NH₂

| Key coupling component | X = | Second coupling component | Colour shade on cotton |
|---|---|---|---|
| " | —NH— | 1-Phenyl-3-carboxy-pyrazolone(5) | " |
| " | —NH— | 1-(4'-Sulfophenyl)-3-carboxy-pyrazolone(5) | " |
| " | —NH— | 4-Methyl-6-hydroxypyridone(2)-3-sulfonic acid | " |
| " | —NH— | 1,4-Dimethyl-6-hydroxypyridone(2)-3-sulfonic acid | " |
| 1-Acetamino-8-hydroxynaphthalene-3,6-disulfonic acid | —NH— | 2-Carboxymethylamino-8-hydroxy-naphthalene-6-sulfonic acid | blue |
| " | —NH— | 2-Hydroxyethylamino-8-hydroxy-naphthalene-6-sulfonic acid | " |
| " | —NH— | 2-Sulfomethylamino-8-hydroxy-naphthalene-6-sulfonic acid | " |
| 1-Acetamino-8-hydroxy-naphthalene-3,6-disulfonic acid | —NH— | 3-Sulfomethylamino-8-hydroxy-naphthalene-6-sulfonic acid | " |
| " | —NH— | 3-Carboxymethylamino-8-hydroxy-naphthalene-6-sulfonic acid | " |
| " | —NH— | 3-Hydroxyethylamino-8-hydroxy-naphthalene-6-sulfonic acid | " |
| 1-Benzoylamino-8-hydroxy-naphthalene-3,6-disulfonic acid | —NH— | 2-Carboxymethylamino-8-hydroxy-naphthalene-6-sulfonic acid | " |
| 1-Acetamino —NH— lene-4-sulfonic acid | 2-Carboxymethylamino-8-hydroxy- | blue naphthalene-6-sulfonic acid | |
| 1-Acetamino-8-hydroxynaphthalene-3,6-disulfonic acid | " | 3-Carboxymethylamino-8-hydroxy-naphthalene-6-sulfonic acid | " |
| 2-Carboxymethylamino-8-hydroxy-naphthalene-6-sulfonic acid | " | 2-Methylamino-8-hydroxynaphthalene-6-sulfonic acid | blue-black |
| 3-Carboxymethylamino-8-hydroxy-naphthalene-6-sulfonic acid | " | 3-Sulfomethylamino-8-hydroxy-naphthalene-6-sulfonic acid | blue-violet |
| 2-Carboxymethylamino-8-hydroxy-naphthalene-6-sulfonic acid | " | 3-Carboxymethylamino-8-hydroxy-naphthalene-6-sulfonic acid | " |
| 2-Hydroxyethylamino-8-hydroxy-naphthalene-6-sulfonic acid | " | 2-Sulfomethylamino-8-hydroxy-naphthalene-6-sulfonic acid | blue-black |
| 2-Sulfomethylamino-8-hydroxy-naphthalene-6-sulfonic acid | " | 2-Carboxymethylamino-8-hydroxy-naphthalene-6-sulfonic acid | " |

Table II

Key coupling component: R¹—N(R²)— naphthalene with OH and (SO₃H)ₙ substituents; and H₂N—C₆H₄—benzazole(X)—NH₂

| Key coupling component | X = | Second coupling component | Colour shade on cotton |
|---|---|---|---|
| 2-Dimethylamino-8-hydroxy-naphthalene-6-sulfonic acid | —O— | 2-Hydroxybenzoic acid | brown |
| " | —O— | 1-Acetylamino-8-hydroxynaphthalene-3,6-disulfonic acid | blue |
| " | —S— | 2-Hydroxybenzoic acid | brown |
| 1-Acetylamino-8-hydroxy-naphthalene-3,6-disulfonic acid | —S— | 1-Hydroxynaphthalene-4-sulfonic acid | violet |

EXAMPLE 3

(a) 22.4 parts of 2-[4'-aminophenyl]-5- (or 6)-aminobenzimidazole in a mixture of 200 parts of water and 50 parts of 30% aqueous hydrochloric acid are tetrazotised with a solution of 13.8 parts of sodium nitrite in 50 parts of water, after adding ice, at 0°–5° C. Stirring is continued for 1 hour and excess nitrous acid is removed with amidosulfonic acid. A solution of 15.6 parts of 2-hydroxybenzoic acid and 40 parts of sodium carbonate in 150 parts of water is then added in the course of approximately 10 minutes to the yellow-brown solution of the tetrazo component. One sided coupling is complete after stirring for a further 2–3 hours at pH 8–10.

The pH of the suspension of the diazotised monoazo dyestuff is then adjusted to 3 with 30% aqueous hydrochloric acid and 20 parts of sodium acetate are added.

A neutral solution of 31.1 parts of 2-hydroxyethylamino-8-hydroxynaphthalene-6-sulfonic acid in 150 parts of water is then run in in the course of 1 hour. Stirring is continued for approximately 12 hours at pH 4–5 and at 40 to 50° C. in order to complete the acid coupling reaction.

The red disazo dye of the structure

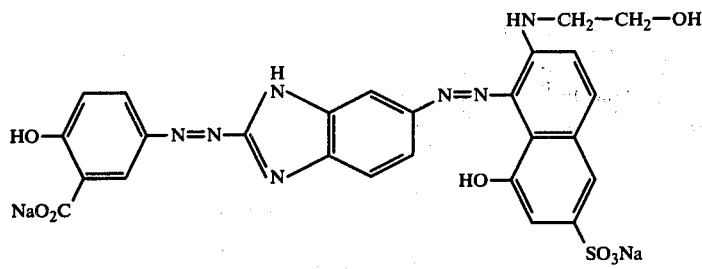

is filtered off and dried at 60°–70° C.

(b) A solution of 0.2 part of sodium carbonate, 4 parts of sodium sulfate decahydrate and 0.2 part of the red dye is made up in a dye beaker. 10 g of a cotton fabric are then kept in continuous agitation in this ready-to-use dye liquor, the temperature is raised to 95° C. and dyeing is carried out for a further 45 minutes at this temperature. The dyed cotton fabric is then withdrawn from the residual liquor, which is now only slightly coloured, and the liquor adhering to the fabric is removed by wringing out. The dyed material is then rinsed with cold water and dried at 60° C.

A red dyeing with good depth of colour and with good fastness properties, particularly good fastness to washing and perspiration, is obtained.

wise, in the course of 2 hours, to the acid solution of the tetrazo component. Then the pH value is adjusted to 4.5 by adding sodium acetate and stirring is continued for 10 to 14 hours at 5°–15° C. in order to complete the one-sided coupling reaction.

A solution of 36.1 parts of 1-acetylamino-8-hydroxynaphthalene-3.6-disulfonic acid, 4 parts of sodium hydroxide and 40 parts of sodium carbonate in 150 parts of water is then added to the suspension of the diazotised monoazo dyestuff.

Stirring is continued for 2–3 hours at pH 8–10, 50 parts of sodium chloride are added and the pH of the coupling mixture is adjusted to 7.5 with 304 aqueous hydrochloric acid. The violet disazo dyestuff of the structure

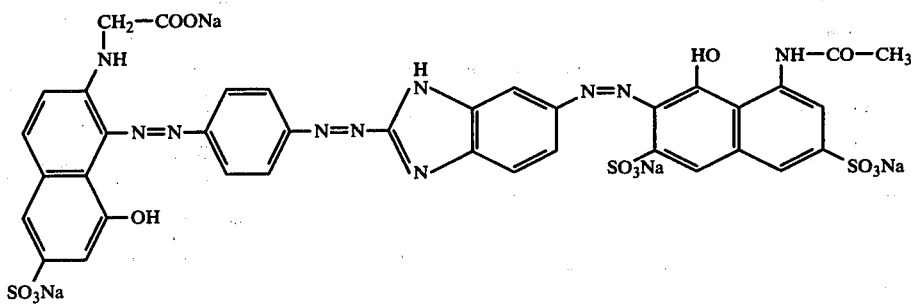

EXAMPLE 4

22.4 parts of 2-[4'-aminophenyl]-5 (or 6)-aminobenzimidazole are tetrazotised in accordance with the instructions of Example 3a. A neutral solution of 29.7 parts of 2-carboxymethylamino-8-hydroxynaphthalene-6-sulfonic acid in 100 parts of water is then added dropwise...

is then isolated by filtration and dried.

The dyestuff dyes cotton in violet colour shades of good depth of colour and with good fastness properties, expecially good fastness to washing and perspiration.

The structural constitution of further dyestuffs which can be prepared in accordance with Examples 3 and 4 are listed in the following tables.

Table IIa

Key coupling component

| Key coupling component | X = | Second coupling component | Colour shade on cotton |
|---|---|---|---|
| 2-Hydroxyethylamino-8-hydroxy-naphthalene-6-sulfonic acid | —NH— | 1-Phenyl-3-carboxy-5-pyrazolone | red |
| " | —NH— | 1-Carboxymethylaminonaphthalene-4-sulfonic acid | claret |
| " | —NH— | 1,3-Diamino-4-methylbenzene-6-sulfonic acid | red |
| " | —NH— | 2-Hydroxybenzenesulfonic acid | red |
| " | —NH— | 1-Hydroxynaphthalene-4-sulfonic acid | violet |
| " | —NH— | 2-Carboxymethylamino-8-hydroxy-naphthalene-6-sulfonic acid | violet |
| " | —NH— | 1-(4'-Sulfophenyl)-3-methyl-5-pyrazolone | red |

Table IIa-continued

Key coupling component

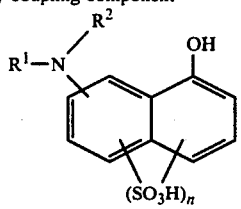 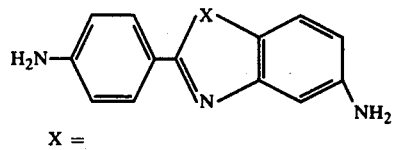

X =

| | X = | Second coupling component | Colour shade on cotton |
|---|---|---|---|
| " | —NCH$_3$— | 2-Hydroxybenzoic acid | red |
| " | —NH—, 4-CH$_3$ | 2-Hydroxybenzoic acid | red |
| " | —NH—, 2'-CH$_3$ | 2-Hydroxybenzoic acid | red |
| " | —NH—, 2'-Cl | 2-Hydroxybenzoic acid | red |
| " | —NH—, 3'-Cl | 2-Hydroxybenzoic acid | red |
| " | —O— | 2-Hydroxybenzoic acid | red |
| " | —S— | 2-Hydroxybenzoic acid | red |
| 3-Hydroxyethylamino-8-hydroxy-naphthalene-6-sulfonic acid | —NH— | 2-Hydroxybenzoic acid | orange brown |
| 2-Hydroxyethylamino-8-hydroxy-naphthalene-6-sulfonic acid | —NH— | Acetoacetic acid-2-sulfoanilid | red |
| " | —NH— | Acetoacetic acid-3-sulfoanilid | red |
| " | —NH— | Acetoacetic acid-4-sulfoanilid | red |
| " | —NH— | Acetoacetic acid-4-carboxyanilid | red |
| " | —NH— | 1-(2'-Sulfophenyl)-3-methyl-pyrazolone(5) | red |
| " | —NH— | 1-(3'-Sulfophenyl)-3-methyl-pyrazolone(5) | red |
| " | —NH— | 1-(2',5'-Dichlor-4'-sulfophenyl)-3-methyl-pyrazolone(5) | red |
| " | —NH— | 1-(4'-Sulfophenyl)-3-carboxy-pyrazolone(5) | red |
| " | —NH— | 1-(4'-Sulfophenyl)-3-methoxy-carbonyl-pyrazolone(5) | red |
| " | —NH— | 4-Methyl-6-hydroxypyridone(2)-3-sulfonic acid | red |
| " | —NH— | 1,4-Dimethyl-6-hydroxypyridone(2)-3-sulfonic acid | red |
| " | —NH— | 2-Hydroxynaphthalene-3,6-disulfonic acid | red-violet |
| " | —NH— | 2-Hydroxynaphthalene-6,8-disulfonic acid | red-violet |
| " | —NH— | 2-Hydroxynaphthalene-6-sulfonic acid | " |
| " | —NH— | 2-Hydroxynaphthalene-8-sulfonic acid | " |
| " | —NH— | 1,3-Dihydroxybenzol | red |
| " | —NH— | 3-Aminophenol | red |
| " | —NH— | 1,3-Diaminbenzol-4-sulfonic acid | " |
| 3-Hydroxyethylamino-8-hydroxy-naphthalene-6-sulfonic acid | —NH— | Acetoacetic acid-3-sulfoanilide | " |
| " | —NH— | 1-(4'Sulfophenyl)-3-methyl-pyrazolone(5) | " |
| " | —NH— | 1-Phenyl-3-carboxypyrazolone(5) | " |
| " | —NH— | 1-(4'Sulfophenyl)-3-carboxy-pyrazolone(5) | " |
| " | —NH— | 4-Methyl-6-hydroxypyridone(2)-3-sulfonic acid | " |
| " | —NH— | 1,4-Dimethyl-6-hydroxypyridone(2)-3-sulfonic acid | " |
| " | —NH— | 1,3-Dihydroxybenzol | " |

Table IIb

Key coupling component

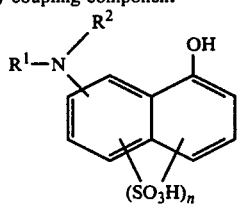 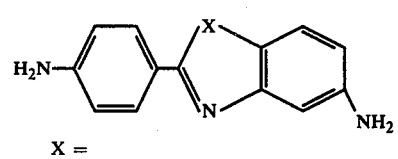

X =

| | X = | Second coupling component | Colour shade on cotton |
|---|---|---|---|
| 2-Hydroxyethylamino-8-hydroxy-naphthalene-6-sulfonic acid | —O— | 2-Hydroxybenzoic acid | red |
| " | —O— | 1-Acetylamino-8-hydroxynaphthalene-3,6-disulfonic acid | violet |
| " | —S— | 2-Hydroxybenzoic acid | red |

The substitution of sulfo groups or hydrocarbon groups or carboxy groups or chlorine anywhere in the final dye molecule does not significantly affect its dyeing characteristics. The substitution of sulfo groups or carboxy groups, particularly the former, is helpful in that this improves the water-solubility of the final dye. More than four such water-solubilizing groups in one dye molecule may have an adverse influence.

Although sulfo and carboxy groups are shown in their acid form, the dyes of the present invention will in use often have these groups partially or completely in salt form as a result of neutralization with sodium, potassium or ammonium compounds or the like that may be present in the reaction mixtures in which they are formed or in the dye mixtures in which they are applied to the materials to be dyed.

Obviously many modifications and variations of the present invention are possible in the light of the above teachings. It is, therefore, to be understood that within the scope of the appended claims the invention may be practiced otherwise than as specifically described.

What is claimed:
1. A water-soluble disazo dye having the structure

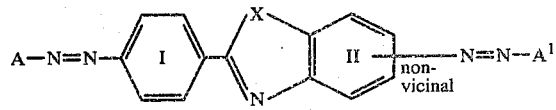

where
X is

—O— or —S—,
R denoting hydrogen, alkyl having up to 4 carbons, phenyl or benzyl,
one of A and $A^1$ is

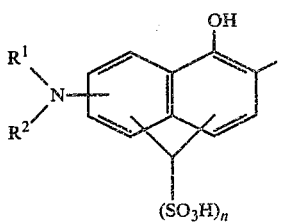

or

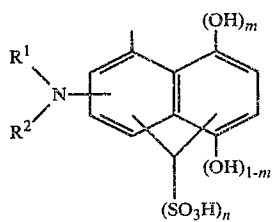

$R^1$ and $R^2$ are identical or different and each is a member selected from the group consisting of hydrogen, alkyl having up to 4 carbons, alkyl carbonyl having 2 to 5 carbons, aryl or aroyl each having 6 to 12 carbons, hydroxyalkyl having 2 to 4 carbons, sulfoalkyl having up to four alkyl carbons and carboxyalkyl having up to four alkyl carbons, with the proviso that only one of $R^1$ and $R^2$ can be hydrogen,
n is 1 or 2,
m is 0 or 1,
and the other of A and $A^1$ is the substituted or unsubstituted radical of a member selected from the group consisting of hydroxybenzene, aminobenzene, amino-hydroxy-benzene, hydroxynaphthalene, N-mono-substituted amino-hydroxy-naphthalene, N,N-disubstituted amino-hydroxy-naphthalene, pyrazolone, 6-hydroxy-2-pyridone, 2,6-diaminopyridine, acetoacetic acid arylamide and dihydroxyquinoline coupling component.

2. A dye according to claim 1 in which said one of A and $A^1$ is

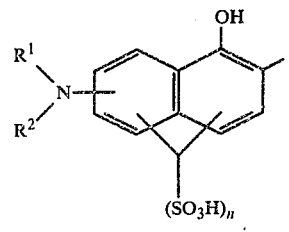

3. A dye according to claim 1 in which said one of A and $A^1$ is

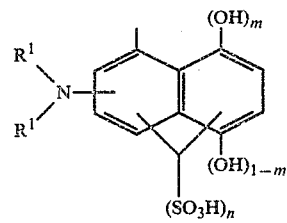

4. A dye according to claim 1 wherein the other of A and A' is

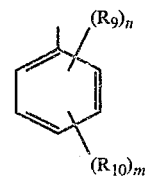

wherein
$R_9$ is

or hydroxyl and g and h may be the same or different and each is selected from the group consisting of hydrogen, alkyl of 1-4 carbon atoms, carboxyalkyl having 1-2 carbons, sulfoalkyl of 1-2 carbon atoms, hydroxyalkyl of 2 carbon atoms, aryl of 6-12 carbon atoms and alkyl carbonyl of 2-5 carbon atoms;

$R_{10}$ is selected from the group consisting of alkyl of alkyl of 1-4 carbon atoms, alkoxy of 1-4 carbon atoms, alkylthio of 1-4 carbon atoms, cyano, nitro, sulfo, carboxyl, halogen, alkoxy carbonyl of 2-5 carbon atoms, alkyl carbonyl of 2-5 carbon atoms and aroyl of 6-12 carbon atoms;

and m and n are as previously defined.

5. A dye according to claim 1 wherein the other of A and $A^1$ is substituted 1-naphthyl or substituted 2-naphthyl having 1-3 substituents selected from the group consisting of

—OH, halogen, alkyl of 1–4 carbon atoms, alkoxy of 1–4 carbon atoms and sulfocarboxy, wherein g and h are the same or different and each is selected from the group consisting of hydrogen, alkyl of 1–4 carbon atoms, carboxyalkyl having 1–2 carbons, sulfoalkyl of 1–2 carbon atoms, hydroxyalkyl of 2 carbon atoms, aryl of 6–12 carbon atoms, aroyl of 6–12 carbon atoms and alkyl carbonyl of 2–5 carbons, with the proviso that at least one naphthyl substituent is

or —OH.

6. A dye according to claim 1 wherein the hydroxyalkyl is 2-hydroxyethyl.

7. A dye according to claim 1 in which the other of A and $A^1$ is

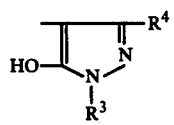

where $R^3$ is hydrogen, alkyl having up to 4 carbons, or phenyl or naphthyl both of which can be substituted by sulfo, nitro, amino, cyano, halo, alkyl having up to 4 carbons, or alkoxy having up to 4 carbons, and $R^4$ is hydrogen, alkyl having up to 4 carbons, carboxyl, or alkoxycarbonyl having up to 5 carbons.

8. A dye according to claim 1 in which the other of A and $A^1$ is

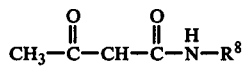

where $R^5$ and $R^7$ are independently hydrogen or alkyl having up to 4 carbons, and $R^6$ is hydrogen, cyano, —CONH$_2$ or —SO$_3$H 9. A dye according to claim 1 in which the other of A and $A^1$ is $$CH_3-\overset{O}{\underset{\|}{C}}-CH-\overset{O}{\underset{\|}{C}}-\overset{H}{\underset{|}{N}}-R^8$$

where $R^8$ is phenyl or naphthyl both of which can be substituted by sulfo, carboxyl, halogen, alkyl having up to 4 carbons and alkoxy having up to four carbons.

10. A dye according to claim 1 in which the other of A and $A^1$ is 2,4-dihydroxy-2-quinolyl or 2,6-diamino-5-pyridyl.

11. A dye according to claim 1 in which X is —$\overset{H}{N}$—.

* * * * *